United States Patent [19]

Lawhon et al.

[11] Patent Number: 4,643,902

[45] Date of Patent: Feb. 17, 1987

[54] METHOD OF PRODUCING STERILE AND CONCENTRATED JUICES WITH IMPROVED FLAVOR AND REDUCED ACID

[75] Inventors: James T. Lawhon, College Station; Edmund W. Lusas, Bryan, both of Tex.

[73] Assignee: The Texas A&M University System, College Station, Tex.

[21] Appl. No.: 648,023

[22] Filed: Sep. 7, 1984

[51] Int. Cl.⁴ .................. A23L 2/36; A23L 2/16

[52] U.S. Cl. .................. 426/271; 426/599; 426/330.5; 426/521

[58] Field of Search .............. 426/271, 590, 592, 599, 426/615, 616, 478, 486, 487, 490, 492, 521, 330, 330.3, 330.5, 386, 387, 15, 333, 422; 210/638, 650, 652

[56] References Cited

U.S. PATENT DOCUMENTS

| | | |
|---|---|---|
| 2,199,522 | 9/1937 | Jones . |
| 3,053,668 | 9/1962 | Lund ..................... 99/205 |
| 3,140,187 | 7/1964 | Brent . |
| 3,342,729 | 9/1967 | Strand . |
| 3,398,091 | 8/1968 | Greatorex . |
| 3,552,574 | 1/1971 | Lowe ..................... 426/490 |
| 3,804,754 | 4/1974 | Ishii . |
| 3,997,685 | 12/1976 | Strobel . |
| 4,018,752 | 4/1977 | Buhler et al. ......... 426/573 |
| 4,083,779 | 4/1978 | Combe . |
| 4,163,010 | 7/1979 | Garbutt ............... 426/490 |
| 4,221,577 | 7/1980 | Wallin . |
| 4,293,571 | 10/1981 | Olofsson et al. ........ 426/490 |
| 4,320,009 | 3/1982 | Hilton . |
| 4,322,448 | 3/1982 | Matsuura et al. ....... 426/387 |
| 4,374,865 | 2/1983 | Strobel . |
| 4,401,678 | 8/1983 | Beaumont ............. 426/490 |
| 4,439,458 | 3/1984 | Puri . |
| 4,463,025 | 7/1984 | Strobel .................. 426/492 |
| 4,491,600 | 1/1985 | Gobel et al. ........... 426/490 |

FOREIGN PATENT DOCUMENTS

| | | | |
|---|---|---|---|
| 2202655 | 5/1974 | France . | |
| 58-56663 | 4/1983 | Japan .................. 426/271 |
| 59-39276 | 3/1984 | Japan .................. 426/271 |

OTHER PUBLICATIONS

Shprtsman et al., 1979 Vino gradarstovo I Vinodelie Moldavii 34(11), 31–34 (abstract).

J. Short, 1983 Oct. issue, Process Biochemistry, p. vi.
B. Breslau et al., Aug. 1984, Process Biochemistry, pp. vii–ix.
E. Wilson et al., 1983, J. Food Science, 48: 1101–1105.
D. Kirk et al., 1983, J. Food Science, 48: 1663–1666.
T. Hanssens et al., 1984, Int. Sugar Jnl. 86(1028) pp. 227–229 and 86(1029) pp. 240–243.
Anon–Feb. 1983, Food Engineering, pp. 106–107.
C. Willits et al., 1967, Food Technology 21(1), 24–26.
Varsel, Citrus Juice Processing as Related to Quality and Nutrition, ACS Symposium Series No. 143 (1980).
Mannheim et al., "Aroma Recovery and Retention in Fruit Juices," Flavours (Nov./Dec. 1975).
Merson et al., "Juice Concentration by Reverse Osmosis," Food Technology 22 (May 1968) 97–100.
Moslang, "Ultra Filtration in the Fruit Juice Industry," Confructa Studien (May/Jun. 1984) 219–224.
Demeczky et al., "The Preparation of Fruit Juice Semi-Concentrates by Reverse Osmosis," Developments in Food Preservation-1 (Stuart Thorne, Ed. Applied Science Publishers London and New Jersey, 1981).

*Primary Examiner*—Raymond N. Jones
*Assistant Examiner*—Carolyn Paden
*Attorney, Agent, or Firm*—Arnold, White & Durkee

[57] ABSTRACT

Ultrafiltration is employed to preferentially pass an ultrafiltration (UF) permeate containing flavor and aroma components while retaining spoilage microorganisms in a UF retentate. The UF retentate is then treated to inactivate a sufficient number of spoilage microorganisms to inhibit spoilage of the juice under storage conditions. A UF permeate containing flavor and aroma components is then recombined with the UF retentate to provide a food juice suitable for storage while avoiding the loss or alteration of the desirable flavor and aroma components of fresh juice encountered in conventional juice processing. If desired, spoilage enzymes can be retained in the UF retentate and inactivated to inhibit deterioration of desirable juice qualities. Further, the UF permeate can be further treated by reverse osmosis to concentrate flavor and aroma components in an RO retentate. If desired, the acid content of juice can be reduced by passing a portion of the RO retentate or UF permeate through an ion-exchange column.

43 Claims, 3 Drawing Figures

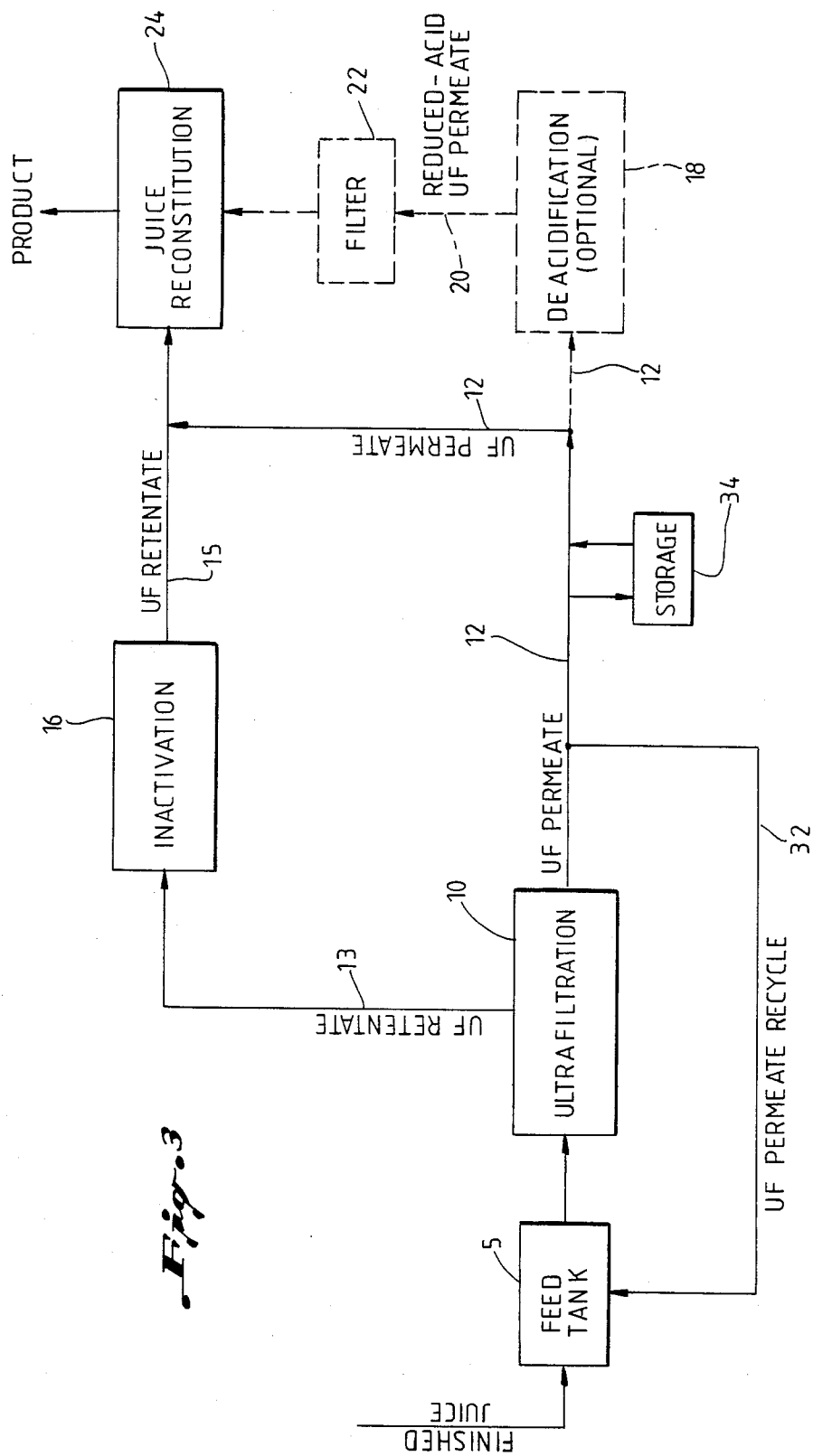

METHOD OF PRODUCING STERILE AND CONCENTRATED JUICES WITH IMPROVED FLAVOR AND REDUCED ACID

BACKGROUND OF THE INVENTION

This invention relates generally to food processing and more particularly to processes for producing various types of food juices which can be stored.

Fresh fruits and vegetables are generally available only during specific growing seasons. Thus, fruits and vegetables are processed while they are available to produce juice which may be stored in order to provide a year round supply.

In processing various types of fruits and vegetables, it is desired to produce juices which retain the characteristics of fresh juice in order to market a product acceptable to consumers. As a result, processors strive to produce juices which retain as much as possible the flavor, aroma, appearance, and mouth feel of fresh juice.

Unfortunately, processes which produce juices suitable for storing involve steps which detract from these desirable characteristics. Juices contain aroma and flavor components which are of low molecular weight and are easily volatilized at temperatures above 40° C. But producing a juice which can be stored generally requires pasteurization to destroy spoilage microorganisms which can cause complete loss of the product or result in undesirable off-flavors and odors. Pasteurization typically employs heating to 62° C. for about 30 minutes, although higher temperatures for shorter periods may be employed. Consequently, these volatile flavor and aroma components are lost, detracting from the flavor and aroma of the juice.

In addition, fruits and vegetables contain enzymes which can cause off-flavors, off-aromas, loss of color or other undersirable characteristics. For example, many fruits and vegetables contain pectin which provides the desirable characteristic body and cloud of many fresh juices such as orange and grapefruit juice. However, many fruits and vegetables also contain pectinesterase, an enzyme which if not inactivated will cause the loss of the desirable body and cloud provided by pectin. This is due to the deesterification of pectin and the subsequent precipitation of methoxyl pectin as calcium pectinate or pectate which results in the clearing of the juice and a noticable layer of precipitate at the bottom. Thus, the juice is heated to inactivate the pectinesterase if the juice is of the type where "cloud" is desired. Disadvantageously, the temperatures required to inactivate pectinesterase are higher than the temperatures required for pasteurization, ranging from approximately 48° to 98° C. Consequently, the loss of flavor and aroma components is further compounded.

Heating juice during processing can also result in the oxidation of compounds in the juice, especially if dissolved air is present. If flavor and aroma compounds are oxidized, the resulting degradation products can produce undesirable off-flavors in the final product.

Processes which involve heating are generally employed in producing "canned" juices suitable for storage at room temperature, chilled juices requiring refrigeration, and frozen concentrated juices. These are typical, for example, of the orange juice industry.

In the orange juice industry, orange juice is produced by passing extracted orange juice through a heating stage to inactivate pectinesterase enzymes and destroy microorganisms. The temperatures typically employed are at least 90° C. in order to inactivate the pectinesterase. In producing chilled juices, which generally require refrigeration at 10° C. or below, the juice is sterilized by rapid heating to about 115° C. for a few seconds followed by a rapid cooling to about 4° C. before filling.

The juice industry's most widely distributed processed citrus product is concentrated frozen orange juice. The conventional method of preparing an orange juice concentrate is by evaporation concentration. This is generally done by thermally accelerated short time evaporation (TASTE) units. In this process, juice passes through preheaters which destroy microorganisms and enzymes. The juice then passes through several stages of evaporators. The actual time spent in evaporation is generally on the order of 6 to 8 minutes. After the last stage, the juice is flash cooled to below 10° C.

In evaporation concentration a significant portion of the various volatile alcohols, esters, and aldehydes which constitute a portion of the flavor and aroma components of juice come off with the first 15 to 20% of the water vaporized. This is referred to as the "essence." Loss of these flavor and aroma components cause significant deterioration in the quality of the juice. However, some of the aqueous essence can be recovered from the first stage of the evaporation process by concentrating the essence in fractionating columns and adding it back to the final concentrate to improve flavor. Still, only a fraction of the compounds are recovered, resulting in a net loss of the overall flavor and aroma of the juice.

Alternate methods of producing juice concentrates without subjecting the flavor and aroma components to heat have also been developed. These methods employ freeze concentration or sublimation concentration.

In freeze concentration, extracted juice is centrifuged to separate a pulp portion and a serum portion. The serum portion is freeze concentrated and the concentrate is added back to the pulp portion. However, in this process, aroma and flavor compounds are entrained in significant proportions in ice crystals separated from the freeze concentrate resulting in a loss of flavor and aroma components and a decrease in the quality of the product.

In sublimation concentration the extracted juice is separated into a pulp and a serum portion as in freeze concentration. Water is removed from the serum as pure vapor using a freeze drying apparatus.

In both freeze concentration and sublimation concentration, undesirable oxidation products can result which impart an off-flavor. However, in one method, oxidative degradation is claimed to be reduced by using an inert atmosphere in a closed system, although unfortunately this system appears to be economically inefficient for large-scale applications due to the added expense of a closed system and the costs of freezing.

Although processes involving freeze concentration and sublimation concentration have claimed retention of at least 65% of the volatile flavor compounds, greater retention of flavor and aroma components is desired.

SUMMARY OF THE INVENTION

The present invention concerns a novel process of producing food juices which avoids the disadvantages of conventional juice processing.

The present invention employs ultrafiltration to preferentially pass an ultrafiltration (UF) permeate containing flavor and aroma components while retaining spoilage microorganisms in a UF retentate. The UF retentate is then treated to inactivate a sufficient number of spoilage microorganisms to inhibit spoilage of the juice under storage conditions. The UF permeate containing flavor and aroma components is then recombined with the UF retentate to provide a food juice suitable for storage while avoiding the loss or alteration of the desirable flavor and aroma components of fresh juice encountered in conventional juice processing.

If present, undesirable spoilage enzymes can be retained in the UF retentate and inactivated to inhibit deterioration of desirable juice qualities while avoiding further loss or alteration of the desirable flavor and aroma components of fresh juice.

In addition, the UF permeate can be further treated by reverse osmosis (RO) to concentrate the flavor and aroma components in a RO retentate. The concentrated flavor and aroma components can then be recombined with the UF retentate to provide a juice suitable for storage or removed in the concentrated form for later dilution before use, or further processed for use as a food, cosmetics, feed, or industrial products ingredient.

Advantageously, the acid content of juice can be reduced if desired by passing a portion of the RO retentate or UF permeate through an ion-exchange column as opposed to passing the entire juice through an ion-exchange column. Further, because the RO retentate and UF permeate are devoid of pulp, column plugging is greatly reduced and good processing rates can be obtained.

If desired, the UF permeate or RO permeate can be recycled through the ultrafiltration membrane providing the further advantage of allowing the juice to be processed either with minimum or no water addition.

BRIEF DESCRIPTION OF THE DRAWINGS

FIG. 3 is a flow diagram depicting an example of the invention employing ultrafiltration alone to produce a reconstituted juice.

DETAILED DESCRIPTION AND PREFERRED EMBODIMENTS

Raw Materials

The process of this invention is broadly applicable to food juices including both fruit juices and vegetable juices. The process is particularly useful in orange juice processing; however it may also be applied to the processing of other juice-bearing citrus fruits, fruits in general, and vegetables. These include but are not limited to grapefruit, lemons, tangerines, tangelos, kumquats, apples, pears, peaches, apricots, pineapples, papaya, passion fruit, berries such as grapes, strawberries, raspberries, currants, and blueberries, and vegetables such as tomatoes, celery, cabbage, onion, watercress, cucumber, carrot, parsley, beets, asparagus, potatoes, turnips, rutabagas, and the like. In addition, the process may be used to prepare flavor concentrates for use as food ingredients, for example, a cucumber concentrate to be used in a cucumber flavor dip.

Figure 1:
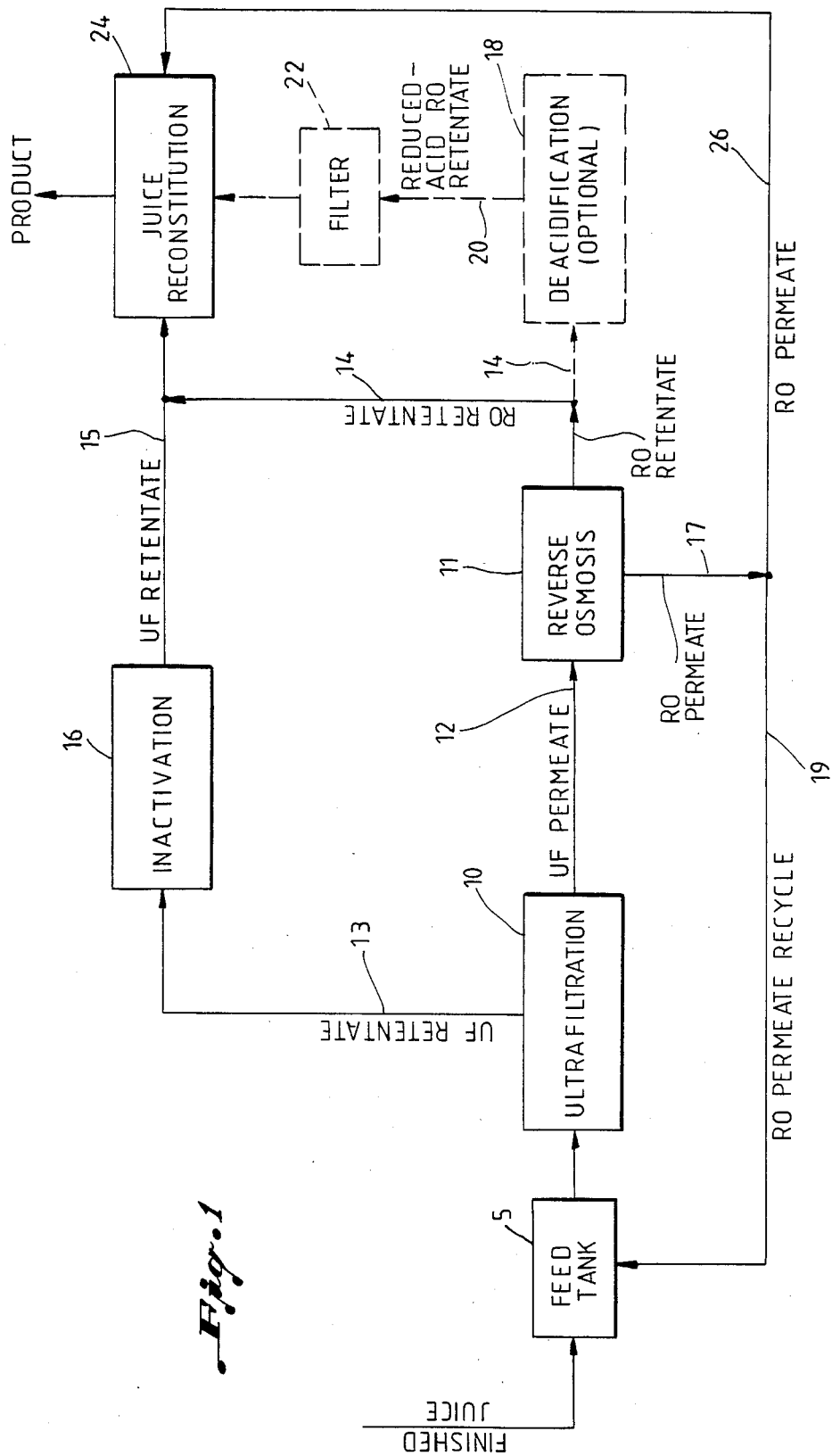
FIG. 1 is a flow diagram depicting an example of the invention employing ultrafiltration and reverse osmosis to produce a reconstituted juice.
Figure 2:
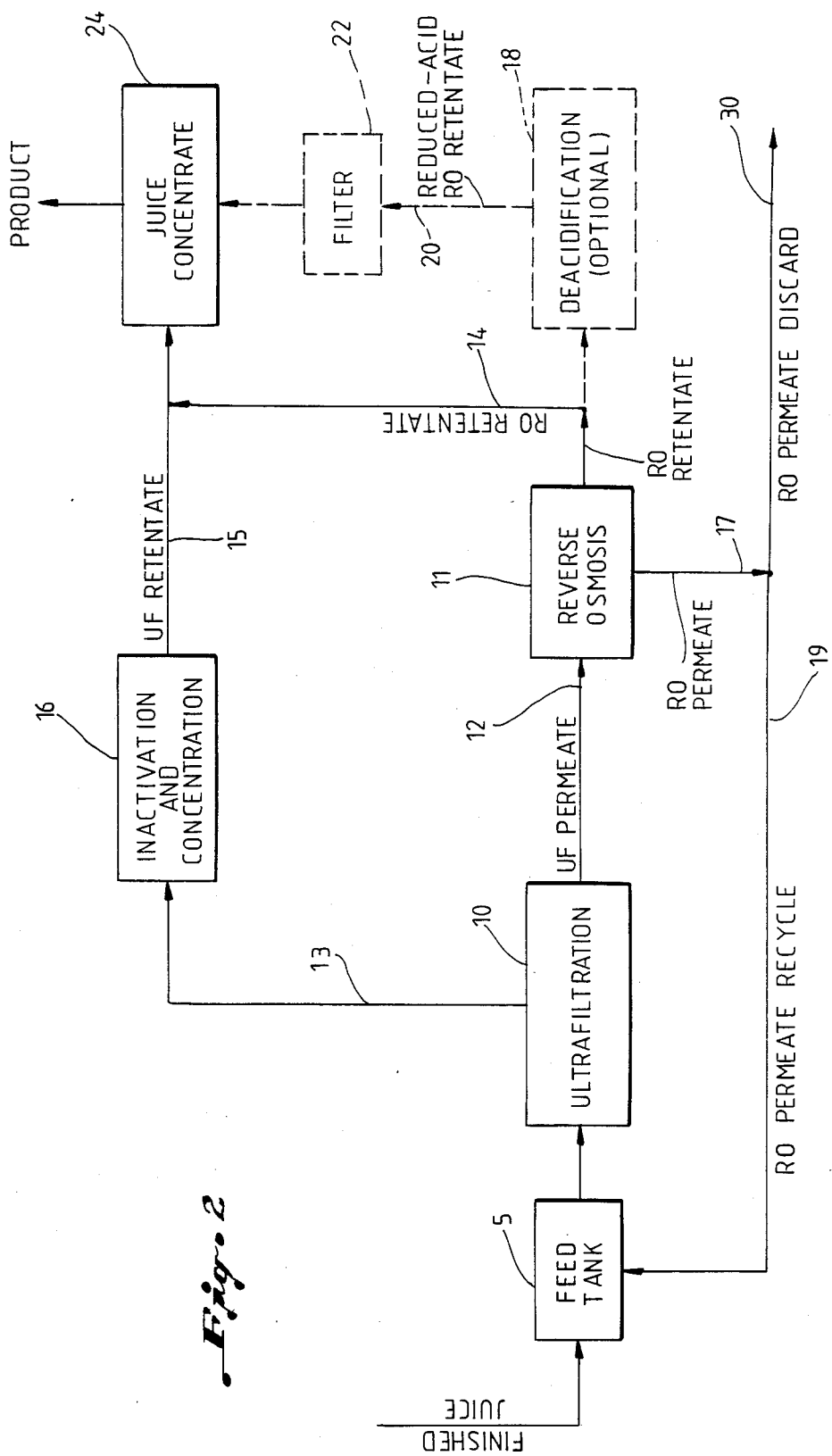
FIG. 2 is a flow diagram depicting an example of the invention employing ultrafiltration and reverse osmosis to produce a concentrated juice.

Referring to FIGS. 1–3, the process begins with providing a juice suitable for ultrafiltration. Fresh extracted juice is obtained from a juice-bearing fruit or vegetable and then the solids content of the juice is lowered ("finished") to a level sufficient for efficient ultrafiltration. The methods employed for preparing the juice for ultrafiltration can vary. For example, if orange juice is to be processed, the juice can be first squeezed from the orange, and the pulp separated from the juice by screening, sieving, or centrifugation. Of course, other juices once extracted may be suitable for ultrafiltration without further lowering of the solids content.

Ultrafiltration

Referring to FIGS. 1–3, the ultrafiltration stage 10 consists of a process in which a liquid is passed through a porous membrane containing pores sufficiently small in size to ensure retention of molecules of a certain minimum size and larger, while allowing molecules of a smaller size to pass through. The volatile flavor and aroma components of fruits and vegetables are of low molecular weight, ranging in size from about 30 to 155 daltons. By selecting an ultrafilter membrane of an appropriate pore size, these low molecular weight flavor and aroma components, as well as other low molecular weight components such as sugars and amino acids, will pass through the pores of the ultrafilter membrane as a UF permeate 12. Other higher molecular weight constituents of the juice (e.g., enzymes, proteins, pectins and oils) are retained on the filter as a UF retentate 13.

Advantageously, UF membranes are tighter than bacteriological filters which have a pore size of less than 1 nanometer. Consequently, with adequate membrane sterilization, the UF permeate 12 containing the flavor and aroma components is free of spoilage microorganisms such as bacteria, yeasts, mold, fungi and the like. Thus, since the microorganisms responsible for spoilage are retained in the UF retentate, they can be inactivated by means which will not affect the flavor and aroma components of the juice.

A further advantage of ultrafiltration in juice processing is that undesirable enzymes, such as pectinesterase and oxidase, can also be retained in the UF retentate 13. Consequently, these often undesirable enzymes can also be inactivated by means which will not affect the flavor and aroma components contained in the UF permeate. In this application, a UF membrane is preferably chosen to have pore sizes as large as possible to enhance the permeation rate and more readily pass flavor and aroma components while still retaining undesirable enzymes.

Since both spoilage microorganisms and enzymes can be retained in the UF retentate, the method of this invention makes it possible to produce a juice suitable for storage without experiencing loss and degradation of flavor and aroma components normally associated with conventional juice processing.

Reverse Osmosis

Referring to FIGS. 1–2, the reverse osmosis stage 11 takes advantage of the diffusion phenomena which take place at the point of existence of a concentration gradient between a solution and its solvent or between two solutions of different concentrations. A semipermeable membrane is employed which selectively allows passage of the solvent while retaining other components of the solution. A hydrostatic pressure is applied to the solution sufficient to overcome the osmotic pressure resulting from concentration differences on opposite sides of the semipermeable membrane. In the present invention, reverse osmosis is used to concentrate flavor and aroma components before recombining them with the treated UF retentate 15. After reverse osmosis processing of the UF permeate, the RO retentate 14 can be remixed with the UF retentate 15. In addition, a portion of the concentrated flavor and aroma components contained in the RO retentate 14 can be retained for use as a food, cosmetics, feed, or industrial ingredient.

As noted above, the pore size of a preferred ultrafilter is sufficiently small to filter out spoilage microorganisms and undesirable enzymes. Thus, any UF permeate fraction passing through such a membrane can be recombined with treated UF retentate to form a product suitable for storage.

Inactivation and Concentration

Referring to FIGS. 1–3, the UF retentate 13 plus any desired pulp or solids removed initially to facilitate ultrafiltration is passed through an inactivation stage 16. During this step, undesirable spoilage microorganisms are inactivated to a sufficient degree to inhibit spoilage of the juice once stored. In addition, if necessary, undesirable enzymes can be sufficiently inactivated to inhibit the loss of the "cloudy" characteristic desirable in some juices, and to inhibit the development of off-flavors, off-aromas, or the loss of color.

The method employed in inactivating the spoilage microorganisms can vary. Spoilage microorgansims include bacteria, fungi, yeasts, molds and the like. Spoilage microorganisms can be inactivated by heating, chemically treating, dessication, UV radiation, x-rays and the like. Generally, heating is the preferred method of inactivating spoilage microorganisms in food processing. Most vegetative cells of bacteria, fungi and the like are sterilized after a few minutes at temperatures of 50°–70° C. In food processing, pasteurization is typically employed to inactivate generally 97-99% of the microorganisms present. Pasteurization is typically accomplished by heating at 62° C. for a period of 30 minutes, although higher temperatures for shorter periods of time can be employed, i.e., flash pasteurization. Heat sterilization processes are selected to reduce innoculated spores of heat-resistant test microorganisms by 4 log cycles or more. pH and water activity conditions, as affected by presence of sugars, salts and other solutes, as well as heat penetration characteristics of the product, affect the temperature and time selected for sterilization.

Pectinesterase, as an example of a spoilage enzyme present in juices, can also be sufficiently inactivated by heat. The temperature required to inactivate pectinesterase is generally in the range of 48° to 90° C. for a period of about 1 to 40 seconds. If it is desirable to inactivate the pectinesterase or other enzymes in the particular juice being processed, the inactivation stage 16 can employ sufficient temperatures for a sufficient period of time to sufficiently inactivate the enzymes and to reduce the number of active spoilage microorganisms to prevent spoilage of the stored juice.

Referring to FIG. 2, the inactivation stage 16 can also involve concentration. In a preferred embodiment of The invention, the UF retentate 13 is concentrated by evaporation concentration employing sufficient temperatures for a sufficient period of time to also inactivate spoilage microorganisms and enzymes.

Deacidification

In the present invention a deacidification stage 18 can be employed wherein the acidity of the RO retentate 14 or the UF permeate 12 can be reduced by ion exchange before recombining these fractions with the inactivated or concentrated UF retentate fraction. Ion exchange is a process involving an interchange of ions of like sign between a solution and an essentially insoluble solid in contact with the solution. Commercial manufacturers of reduced-acid frozen concentrated orange juice, for example, use anionic exchange resins to reduce the acidity of their product so that the ratio of the Brix reading to the grams of acid, expressed as anhydrous citric acid per 100 grams of juice, is not less than 21 to 1 or more than 26 to 1.

The acid reduction stage 18 of the present invention provides advantages not found in conventional juice processing. The RO retentate 14 or UF permeate 12 passing through an exchange column contains virtually no pulp or suspended solids to plug the column. Also, since the RO retentate is highly concentrated only a minor fraction of it need be passed through the column.

If desired, the reduced-acid product 20 (RO retentate or UF permeate) can be passed through a bacteriological filter stage 22 prior to the recombining stage 24 to further ensure the absence of spoilage microorganisms.

After passing through the deacidification stage 18, the reduced-acid portions 20 of the RO retentate or UF permeate are recombined with the treated UF retentate 15 and the remainder of the non reduced-acid RO retentate 14 or UF permeate 12.

Recycling

In various embodiments of the present invention, the process can be operated so as to avoid the introduction of water into the materials being processed other than that which is inherent in the fruits or vegetables themselves.

Referring to FIGS. 1–2, in one embodiment of the invention, the UF processing is begun by continually circulating undiluted juice through an appropriate membrane system. The UF permeate, which contains the flavors, sugars, etc., passes through the ultrafiltration stage 10 and is then directed to a reverse osmosis membrane system for further processing. The reverse osmosis membrane in stage 11 retains essentially all the dissolved solids in the UF permeate 12 and discharges water as an RO permeate effluent 17. The RO permeate is then recycled 19 to the ultrafiltration processing stage 10 and used as ultrafiltration water to enhance the movement of the low molecular weight components in the juice through the UF membrane in stage 10. When the desired amount of the UF permeate has passed through the UF membrane, the RO permeate recycling is stopped, and the UF retentate 13 is concentrated to the desired level and discharged. In FIG. 1, the RO permeate is recombined 26 with the UF retentate in stage 24 to make a reconstituted juice. In FIG. 2, the RO permeate is ultimately discarded 30, since it is not needed for a juice concentrate. The other process steps remain the same.

Referring to FIG. 3, in another embodiment of the invention the processing of a juice is begun by continually circulating undiluted juice through an appropriate UF membrane system. The UF permeate 12 contains the flavors, sugars and other low molecular weight components. In this embodiment, the UF permeate can be stored in a storage stage 34 for subsequent processing, for use in juice reconstitution, or for recycling into the membrane feed tank 5 to assist in washing additional flavors, sugars and other low molecular weight components through the membrane. UF permeate, if desired, can be recycled in this procedure for the purpose of increasing the concentration of flavors, sugars and other low molecular weight components in the final UF permeate passing through the stage 10 membrane. When recycling is stopped, the UF retentate is concentrated to the desired level and discharged to the inactivation stage 16. The other process steps remain the same.

The process of FIG. 3 is primarily applicable when a reconstituted juice concentrate is not desired. The absence of an RO processing step (where higher pressures are required) provides a further advantage of reducing the cost of the process.

EXAMPLES

The following examples describe the actual systems studied for processing juices and illustrate the invention in more detail. The examples are based on work with orange juice and grapefruit juice; however, the principles ascertained are considered to have application to other food juices as well. The invention is a broad concept and is applicable to processing food juices in general. The following examples, accordingly, shall not be construed as limiting the scope of the invention.

The procedures employed for determining total solids, nitrogen content, ash, sugars, pectinesterase activity, acid content and free and suspended pulp data contained in the following examples are from the USDA Citrus Products Technical Manual, January 1979 or the AOAC Methods, 13th Edition, 1980.

EXAMPLE 1

Preparation for Ultrafiltration

Finished orange juice was obtained by extracting the juice from oranges with a Model No. 55 Orangematic juice extractor manufactured by Orangematic, Inc., Irvine, Calif. The extractor contained a screen with 0.0625 inch openings and thus contained a higher level of pulp than would be found in commercial operations. Orange juices from both Florida and Texas grown oranges were prepared for processing.

Finished grapefruit juice was prepared by slicing grapefruit into halves and removing the juice with household-type juice extractors. Seed, large pulp, etc. was removed by passing the extracted juice over coarse hand screens. Grapefruit juice from the Texas Star Ruby variety and a white grapefruit variety was processed.

Three methods of further depulping finished orange juice for ultrafiltration were studied: (1) centrifugation with a Westfalia Continuous Separator, (2) screening with a 165 mesh, stainless steel vibrating Dynascreen, and (3) screening with a Brown International Corporation Finishing Press. The Brown press was operated at pressures ranging from 20 to 50 psi.

Tables 1 and 2 below present the results obtained in the above studies. The results consist of analyses performed on orange juice finished as in Example 1 before and after further depulping.

TABLE 1

Composition of orange juice before and after pulp removal

| Depulping method | Total solids, % | Nitrogen, % | Protein (N × 6.25), % | Ash, % | Total sugars, % |
|---|---|---|---|---|---|
| Orange juice before depulping | 11.1 | 0.13 | 0.81 | 1.2 | 9.5 |
| Centrifugation | 10.3 | 0.10 | 0.62 | 1.8 | 8.8 |
| Vibrating screen | | | | | |
| 100 mesh | 10.5 | 0.12 | 0.76 | 0.9 | 9.2 |
| 120 mesh | 10.5 | 0.13 | 0.79 | 0.6 | 8.5 |
| 165 mesh | 10.3 | 0.13 | 0.78 | 1.6 | 9.2 |

TABLE 2

Solids and pulp content of orange juice before and after pulp removal

| Depulping method | Total solids, % | Brix | Wet pulp, % |
|---|---|---|---|
| Orange juice before depulping | 11.6 | 12.4 | 27.0 |
| Vibrating screen (165 mesh) | 10.7 | 11.9 | 17.9 |
| Finishing press | | | |
| 20 psi | 10.9 | 12.0 | 18.2 |
| 35 psi | 10.7 | 12.0 | 18.9 |
| 50 psi | 10.7 | 11.8 | 17.5 |

Of the three juice depulping methods examined (Tables 1 and 2), the vibrating screen proved to be the most practical for use in small-scale pilot plant trials. However, the Westfalia centrifuge and Brown International Corporation press were considered to be more representative of equipment currently used in commercial processing. All three methods were satisfactory for lowering pulp in orange or grapefruit juice to an acceptable level for UF processing. Three vibrating screens (100, 125, and 165 mesh) were tested. A 165 mesh screen was chosen for use.

Extracted juice prepared according to this example was used to make the seven runs depicted in the following examples: Two runs of orange juice with water addition (Runs A and B), three runs of orange juice without water addition (Runs C, D and E), and two runs of grapefruit juice without water addition (Runs F and G).

EXAMPLE 2

UF Systems

UF processing of the juice prepared according to Example 1 was conducted using three Romicon, Inc. hollow fiber industrial membrane cartridges (PM 100, PM 50, PM 30) with molecular weight cutoff (MWCO) points of 100,000, 50,000, and 30,000 daltons, respectively. Each cartridge contained 660 hollow fibers (43 mil fiber diam.) and had 26 ft.$^2$ (2.246 m$^2$) of membrane surface. Depulped juice was ultrafiltered at a pressure and flow rate of 25 psi (172 KPa) and 17 GPM (64 LPM), respectively.

Data obtained on orange juice and grapefruit juice using the above 100,000 and 50,000 MWCO filters are presented below in Table 3.

TABLE 3

UF membrane performance on diluted orange juice and on undiluted orange and grapefruit juice

| Performance Measurements | | Processing with water addition Orange 100,000 MWCO | Processing without water addition | |
|---|---|---|---|---|
| | | | Orange 50,000 MWCO | Grapefruit 50,000 MWCO |
| Mean flux, GFD | | 34.6 | 20.7 (Low pressure) | 28.9 |
| % Mean Retentions | Solids | 16.8 | 30.5 | 33.3 |
| | Ash | 8.4 | | 23.3 |
| | Sugars | 11.1 | 36.4 | 28.4 |

A 100,000 MWCO UF membrane was used when water was added to orange juice during processing (Example 7). A 50,000 MWCO UF membrane was used when orange and grapefruit juices were processed without adding water to the system (Example 8). Although a 30,000 MWCO UF membrane was tried, the 50,000 MWCO UF membrane was preferred since it did not pass any pectinesterase (Example 9) and provided a better permeation rate than the tighter 30,000 MWCO filter.

Table 3 shows UF membrane performance data on diluted orange juice and on undiluted orange and grapefruit juice. The 100,000 MWCO membrane processed diluted juice with a higher flux (permeation rate), as expected, since the solids concentration was lower. The flux data shown for the 100,000 MWCO membrane were taken while processing at a lower temperature (23° C.) than was required. A processing temperature of 35° C. could have been safely used without loss of volatile flavors. Increasing the temperature raises the membrane flux.

The flux shown in Table 3 for grapefruit juice processing is considered more representative of the 50,000 MWCO membrane than the flux shown for orange juice processing. The flux data for orange juice were taken during a trial in which the system pressure stayed below normal. Mean percentages of solids, ash, and sugars retained by the membranes are also shown in Table 3.

UF retentate was directed to a heating stage to inactivate microbes and enzymes. (Example 3). UF permeate was directed to an RO system to simultaneously concentrate the flavor and aroma compounds, sugars, amino acids, etc. for eventual reconstitution to single-strength juice. (Example 4).

EXAMPLE 3

Pasteurization and Enzyme Inactivation

UF Retentate obtained according to Example 2 was combined with the pulp previously removed from the "finished" juice of Example 1 and subjected to a high-temperature, short-time heat treatment. UF retentate plus pulp was pasteurized with a Model X1W Votator scrape-surface heat exchanger. These materials were heated to temperatures ranging from 97° to 105° C. for estimated periods of 3 to 5 seconds. Effluent from the Votator heat exchanger passed to the cooling side of an APV Jr. HTST pasteurizer from which it emerged at a temperature of 15.6° C.

EXAMPLE 4

RO System

UF permeate obtained according to Example 2 was concentrated by a tubular RO membrane system manufactured by Patterson Candy International Ltd. (PCI). The RO system was equipped with 27.98 ft$^2$ (2.6 m$^2$) of PCI's ZF-99 noncellulosic membrane. The membrane was stated by the manufacturer to have a 99% rejection for NaCl. Permeate was concentrated at pressures up to 700 psi (4826 Kpa). The temperature of the feed to the RO system was maintained below 34° C. by circulating chilled water through the feed reservoir jacket. A portion of the RO retentate was directed to an acid reduction stage. (Example 6).

EXAMPLE 5

Membrane Cleaning

The UF and RO membranes used in Examples 2 and 4 were easily cleaned after use in orange or grapefruit juice processing.

UF Membranes

The procedure for cleaning UF membranes to restore their original flux after citrus juice processing consisted of (1) rinsing with water for about 5 min under normal operating pressure with both permeate and retentate being discarded, (2) circulating a solution of NaOH [NaOH dissolved in water at 40° to 60° C. to a pH of 12.0 to 12.5 (1.0% soln by wt.)]through the system at 25 psi inlet and near zero outlet pressures with both permeate and retentate returned to the feed tank, (3) rinsing with water for 5 to 10 min. with permeate and retentate being discarded, and (4) testing membranes for cleanliness using the HACH High Range Chlorine Test Kit Model CN-21P manufactured by HACH Chemical Company, Ames, IA. If the membrane did not test clean, Steps 2 and 3 were repeated using $H_2PO_4$ at pH 2.0 to 2.5 instead of NaOH.

RO Membranes

The procedure for cleaning RO membranes involved (1) rinsing the system with water for 5 min at 300 to 400 psi, (2) circulating a 0.3% soln. by wt. of Wisk detergent for 30 min at 300 to 400 psi, (3) rinsing with water for 5 to 10 min at 300 to 400 psi, and (4) testing the membrane flux using tap water at ambient temperature with the operating pressure at 600 psi.

If the flux was less than 2.0 LPM, (the flux considered to be indicative of a clean membrane), Steps 2, 3, and 4 were repeated using a 0.3% soln. of $HNO_3$. If after the second test the membrane was not clean, Steps 2, 3 and 4 were repeated using a 0.3% soln. of NaOH. After cleaning, the RO system was sanitized with 0.5% solution of sodium metabisulfite in water.

EXAMPLE 6

Acid Reduction

A portion of orange juice and grapefruit juice concentrated according to Example 4 was passed through an acid reduction stage.

An ion exchange column with a weak base anionic resin bed was fabricated. Hollow fiber membranes were removed from the plastic shell of a Romicon, Inc. UF cartridge. The 3.0 in (7.6 cm) diameter, 43 in (109 cm) long, cylindrical shell was then filled with Rohm and Haas Amberlite± IRA-93 weakly basic anion exchange resin which contains tertiary amine functionality on a styrene-divinylbenzene matrix. (Run B, Table 5 was passed through a column containing Rohm and Haas Amberlite± IRA-45 rather than Rohm and Haas Amberlite± IRA-93 as in the other runs.) Strainers were fitted in each end of the column to retain the resin yet allow passage of the juice fraction being processed. A second empty plastic shell was attached to the top of the column with the upper strainer removed during regeneration of the resin to provide room for expansion.

The portion of the RO retentate passed through the acid reduction stage was pumped through the column at 300 ml/min to provide the acid reduction desired. Reduced-acid RO retentate then was mixed in different ratios with normal acid RO retentate for use in juice reconstitution.

EXAMPLE 7

Processing with Water Addition

A portion of orange juice prepared according to Example 1 was processed in two runs with water addition. The processing in Run A included ultrafiltering according to Example 2, pasteurization according to Example 3, and concentrating according to Example 4. Run B further included deacidification according to Example 6, using the Rohm and Haas Amberlite± IRA-45 resin.

Deionized or distilled water (12 to 15 gals.) was added to a like quantity of depulped orange juice prior to UF processing to dilute it to one half its total solids concentration and thereby increase the membrane permeation rate. The ultrafiltration technique employed from the outset of processing involved adding water to the feed reservoir at the same rate that water was removed through the membranes as UF permeate. Thus, the original volume of feed was maintained constant during the ultrafiltration phase of processing. Ultrafiltration continued until a volume of permeate equal to 1.4 times the volume of depulped orange juice had been collected. At that point, water addition ceased and the feed was concentrated until the volume of permeate collected equalled 2.75 to 3.0 times the volume of depulped juice processed. UF processing temperature was maintained below 34° C.

Tables 4 and 5 show data on orange juice fractions obtained when deionized water was added to the juice processing.

TABLE 4

Analytical data on orange juice fractions - processing with water added - Run A

| Fraction | Total solids, % | Ash, % | Total sugars, % | pH |
|---|---|---|---|---|
| Fresh juice | 10.65 | 0.91 | 6.93 | 3.86 |
| Screened pulp | 6.95 | 0.31 | 3.47 | 4.09 |
| Screened juice - 165 mesh | 10.33 | 1.28 | 7.27 | 3.97 |
| Pulp wash water | 6.76 | 0.39 | 4.93 | 3.97 |
| Diluted juice to UF | 5.16 | 0.64 | 3.34 | 4.24 |
| UF retentate | 6.51 | 0.24 | 2.47 | 4.45 |
| UF system flush | 2.40 | 0.10 | 1.13 | 5.05 |
| UF permeate to RO system | 2.40 | 0.17 | 1.64 | 4.44 |
| RO retentate | 22.16 | 3.34 | 14.18 | 4.19 |
| RO system flush | 17.05 | 1.61 | 10.24 | 4.24 |
| RO permeate | 0.024 | 0.01 | 0.0037 | 4.19 |

TABLE 5

Analytical data on orange juice fractions - processing with water added - Run B

| Fraction | Total solids, % | Ash, % | Total sugars, % | pH |
|---|---|---|---|---|
| Fresh juice | 7.24 | 0.53 | 5.58 | 3.65 |
| Screened pulp | 5.09 | 0.14 | — | 3.85 |
| Screened juice - 165 mesh | 7.07 | 0.42 | 5.44 | 3.71 |
| Pulp wash water | 2.26 | 0.12 | — | 4.11 |
| Diluted juice to UF | 3.54 | .21 | 2.72 | 3.88 |
| UF retentate | 5.27 | 0.21 | 1.94 | 4.22 |
| UF system flush | 0.63 | 0.05 | 0.34 | 6.14 |
| UF permeate to RO system | 2.05 | 0.14 | 1.55 | 4.13 |
| RO retentate | 13.81 | 2.75 | 11.16 | 3.94 |
| RO system flush | 7.96 | 0.63 | 6.53 | 4.01 |
| RO permeate | 0.012 | none measured | 0.0036 | 5.69 |
| RO retentate-reduced acid | 8.20 | 0.55 | 6.03 | 6.56 |

Screened pulp was rinsed, and the pulp wash water added to screened juice prior to UF processing. Solids concentration, ash, sugars, and pH are shown for each fraction. The UF retentate solids content was not increased appreciably over that of the screened juice because (1) as processing progressed a major portion of the solids (flavor compounds, sugars, etc.) was passed through the membrane, and (2) the volume of juice being processed did not permit reducing the UF retentate volume further. UF retentate, UF system flush water, and screened pulp were combined and heated to destroy microbial and enzyme activity as in Example 3.

Solids in the RO retentate varied according to the length of time the RO system was permitted to concentrate the UF permeate. In Run A (Table 4), the UF permeate was concentrated to 22.16% solids. If a larger volume of UF permeate had been available, a higher solids concentration could have been achieved. RO permeate from Runs A and B contained fewer solids (0.024% and 0.012%, respectively) than the local tap water (0.055%). The RO permeate contained only a trace of flavor.

Changes in pH from point to point in the process are also shown in Tables 4 and 5. When processing with external water added to the system (and later removed) it is obvious that the pH can be controlled to the level desired. The pH of reconstituted juice from Run A was near that of reduced-acid juice.

EXAMPLE 8

Processing without Water Addition

The grapefruit juice and a portion of the orange juice prepared according to Example 1 were processed without water addition. The depulped orange juice and grapefruit juice were pumped without dilution to a UF membrane and processed according to Example 2. UF permeate from the membrane was in turn directed to a reservoir feeding the RO system. When 3 to 4 gallons of UF permeate had been collected, RO processing according to Example 4 was begun. RO permeate then was directed back into the UF feed tank, serving as ultrafiltration water to remove more sugar, flavor, and aroma compounds, etc. through the UF membrane.

After a sufficient volume of UF permeate had passed through the membrane (2.50–3.0 times the volume of depulped juice), RO permeate recycling was stopped and the UF permeate was concentrated to the point desired. RO permeate was collected for use in reconstituting orange juice or grapefruit juice. The processing in Runs C and D (orange juice) and Run E (grapefruit juice) further included deacidification according to Example 6 using Rohm and Haas Amberlite± IRA-93 resin which was found to be preferred for this application.

Tables 6, 7, and 8 show data on the orange and grapefruit juice fractions obtained while processing as above without adding water to the system.

TABLE 6

Analytical data on orange juice fractions - processing without water added - Run C

| Fraction | Total solids, % | Ash, % | Total sugars, % | pH |
|---|---|---|---|---|
| Fresh juice | 9.31 | 1.80 | 8.89 | 4.26 |
| Screened pulp | 10.24 | 0.47 | 8.63 | 4.21 |
| Screened juice - 165 mesh | 9.22 | 0.77 | 9.07 | 4.31 |
| RO retentate flush | 20.90 | 8.77 | 20.43 | 4.17 |
| RO permeate | 0.011 | 0.00 | .009 | 6.10 |
| RO retentate-reduced acid | 19.01 | 4.32 | 16.91 | 8.45 |

TABLE 7

Analytical data on orange juice fractions - processing with water added - Run D

| Fraction | Total solids, % | Ash, % | Total sugars, % | pH |
|---|---|---|---|---|
| Fresh juice | 11.57 | 0.49 | 9.97 | 4.15 |
| Screened pulp | 11.64 | 0.64 | 8.21 | 4.12 |
| Screened juice - 165 mesh | 10.78 | 0.44 | 7.03 | 4.15 |
| UF retentate + system flush | 2.30 | 0.06 | 0.78 | 4.26 |
| RO retentate + system flush | 17.78 | 4.11 | 18.45 | 4.14 |
| RO permeate | 0.025 | 0.006 | 0.016 | 5.43 |
| RO retentate-reduced acid | 16.70 | 0.67 | 16.51 | 8.78 |

TABLE 8

Analytical data on grapefruit juice fractions - processing with water addition - Run F

| Fraction | Total solids, % | Ash, % | Total sugars, % | pH |
|---|---|---|---|---|
| Fresh juice | 8.08 | 0.29 | 6.43 | 3.35 |
| Screened pulp | 8.59 | 0.25 | 6.80 | 3.24 |
| Screened juice - 165 mesh | 7.42 | 0.26 | 6.52 | 3.37 |
| UF retentate | .957 | 0.01 | 1.13 | 3.93 |
| UF system flush | .190 | — | 0.076 | 4.19 |
| RO retentate | 20.95 | 0.73 | 21.27 | 3.29 |
| RO system flush | 8.50 | 0.30 | 8.68 | 3.41 |
| RO permeate | 0.018 | — | 0.024 | 4.38 |
| RO retentate-reduced acid | 17.11 | 0.81 | 17.12 | 7.77 |

The screened pulp was not rinsed with water using this procedure. The UF retentate fraction from Run C, Table 6, was not analyzed. The UF retentate and UF system flush were combined and analyzed in Run D (Table 7).

When processing without water addition RO permeate was used for ultrafiltration water and for system flush water. The UF and RO membrane systems as well as the pasteurizing heat exchanger were flushed with RO permeate following completion of each of these steps.

Passing the RO retentates of Runs C and D through the ion exchange column lowered their solids content and raised their pH to 8.45 and 8.78, respectively. Using Amberlite± IRA-93 resin in the column it was necessary to pass only 8% of the RO retentate plus system flush through the column to prepare a reduced-acid orange juice having a Brix/titratable acidity ratio of 21.6. It is noted that the percentage of RO retentate necessary to pass through the column will vary with the pH of the juice being processed.

Table 8 contains data from Run F (grapefruit juice processing). In the run shown, the UF retentate was not processed to a high solids concentration. However, the RO retentate was concentrated to 20.95% solids. Grapefruit juice, as expected, maintained a lower pH than orange juice during processing. The pH of grapefruit RO retentate that passed through the ion exchange column was 7.77. Grapefruit juice was reconstituted using RO retentate that included 22%, 25%, and 28% of reduced-acid RO retentate that had passed through the ion exchanger. An informal five-member taste panel expressed a preference for reconstituted juice-containing RO retentate of which 25% had been reduced in acid. The preferred juice had a Brix/titratable acidity ratio of 11.9.

EXAMPLE 9

Pectinesterase Measurements

The pectinesterase enzyme activities of orange and grapefruit juice and of selected fractions from orange and grapefruit juice in Runs C, D, E and G processed according to Example 8 without water addition are shown in Table 9.

TABLE 9

Pectinesterase activity of orange and grapefruit juice and of selected fractions from orange and grapefruit juice processed without water addition.

| Juice and fraction | 50,000 MWCO | 100,000 MWCO |
|---|---|---|
| Fresh O.J. - Run C | 1.75 | 1.75 |
| Feed to membrane @ start | 3.39 | 2.11 |
| Feed to membrane after 15 min. | 3.39 | 2.97 |
| Permeate @ start | 0 | 0 |
| Permeate after 15 min. | 0 | 0 |
| Fresh O.J. - Run D | 5.06 | |
| Screened pulp | 83.33 | |
| Screened O.J. - 165 mesh | 4.10 | |
| Feed to membrane after 3 min. | 8.40 | |
| Permeate after 3 min. | 0 | |
| UF retentate & pulp fr. heat exch. | 0 | |
| Reconstituted O.J. | 0 | |
| Fresh O.J. - Run E | 3.14 | |
| Feed to membrane after 20 min. | 3.45 | |
| Permeate fr. membrane after 20 min. | 0 | |
| Fresh grapefruit juice - Run G | 1.25 | |
| Feed to membrane @ start | 1.44 | |
| Permeate fr. membrane @ start | 0 | |
| Feed to membrane after 15 min. | 2.59 | |
| Permeate fr. membrane after 15 min. | 0 | |

The orange juice in Run C was processed for a short time by a 100,000 MWCO membrane and then switched to a 50,000 MWCO membrane. In each case, the juice being processed and the UF permeate from it were sampled initially and after 15 min of processing and a pectinesterase determination (P.E.U. test) made on each sample. As shown in Table 9, pectinesterase activity was absent from the UF permeate in Runs D, E and G.

EXAMPLE 10

Recombination

UF retentate and pulp inactivated according to Example 3, were recombined with RO retentate and RO permeate, obtained according to Example 4, to give orange juice and grapefruit juice with a solids concentration about equal to that of the finished juice prepared in Example 1. When preparing reduced-acid juices, normal-acid RO retentate was mixed with reduced-acid RO retentate in different ratios to give reduced-acid juices having Brix/titratable acid ratios within the range desired.

In recombining the juice fractions during reconstitution, allowance was made for processing losses and samples removed for analyses at various points in the process.

Table 10 shows the fresh juice extracted for each run and the reconstituted juices (both regular and reduced-acid) from processing with and without water addition for Runs A, B, C, D and F. Runs E and G are not shown.

TABLE 10

Fresh and reconstituted orange and grapefruit juices - processed with and without water addition

| Process and Product | Total solids, % % | Ash, % PO | Total sugars, % % | pH | Brix | Titratable acid | Brix T.A. |
|---|---|---|---|---|---|---|---|
| With Water Addition | | | | | | | |
| Run A Fresh O.J. | 10.65 | 0.91 | 6.93 | 3.86 | — | — | — |
| Recon. O.J. | 11.87 | 0.70 | 7.22 | 4.23 | — | — | — |
| Run B Fresh O.J. | 7.24 | 0.53 | 5.58 | 3.65 | — | — | — |
| Recon. O.J. | 7.43 | 0.47 | 5.20 | 4.04 | 9.8 | 0.656 | 14.9 |
| Reduced-acid | 6.11 | 0.37 | 4.36 | 4.44 | 7.9 | 0.376 | 21.0 |
| Without Water Addition | | | | | | | |
| Run C Fresh O.J. | 9.31 | 1.80 | 8.89 | 4.26 | 12.2 | 0.489 | 24.9 |
| Recon. O.J. | 10.82 | 0.65 | 8.59 | 4.31 | 12.2 | 0.529 | 23.1 |
| Reduced-acid recon. O.J. | 10.42 | 1.01 | 7.61 | 4.49 | 11.4 | 0.317 | 36.0 |
| Run D Fresh O.J. | 11.57 | 0.49 | 9.97 | 4.15 | 18.2 | 0.700 | 18.9 |
| Recon. O.J. | 10.96 | 0.39 | 8.54 | 4.19 | 13.0 | 0.668 | 19.5 |
| Reduced-acid recon. O.J. | 11.04 | 0.40 | 9.31 | 4.22 | 13.0 | 0.602 | 21.6 |
| Run F Fresh G.F.J. | 8.08 | .21 | 6.96 | 3.35 | 9.4 | 0.840 | 11.2 |
| Recon. G.F.C. | 8.83 | 0.28 | 7.54 | 3.36 | 11.2 | 1.38 | 8.12 |
| Reduced-acid | 8.33 | 0.30 | 6.41 | 3.53 | 10.8 | 0.906 | 11.9 |

The reconstituted juices were, in general, prepared by estimating losses due to sampling, screening, membrane holdup, and spillage. Usually the losses were overestimated and the reconstituted juices tended to have a higher solids concentration than the starting juices.

As evidenced in Table 10, the pH of each batch of fresh orange juice varied. This was due in part to the difference in variety of the oranges used, and in part to the time of the season when the oranges were harvested. For example, the acidity of the oranges decreases as the season continues.

As previously mentioned, reconstituted juices from processing with water addition gained in pH during processing. This resulted from the dilution and ultrafiltration water that was not completely deionized.

The reduced-acid juice of Run B had an undesirably high pH and Brix/titratable acidity ratio because too much RO retentate from the ion exchange column was used in reconstitution. When processing without water addition, the pH of reconstituted juice was essentially unchanged from that of the starting juice.

It should be recognized that in the examples described above, processing was conducted in a batch mode as opposed to a continuous mode where multiple stages of UF and RO membranes would be employed. In a continuous mode of operation, the residence time of juice during processing would be shortened considerably.

What is claimed is:

1. A method of preparing a food juice suitable for storage comprising:

(a) providing from a juice-bearing fruit or vegetable a juice suitable for ultrafiltration;
    (b) permeating said juice through an ultrafiltration (UF) stage which preferentially passes a UF permeate containing flavor and aroma components while retaining spoilage microorganisms in a UF retentate;
    (c) treating said UF retentate to inactivate a sufficient number of spoilage microorganisms to inhibit spoilage of the juice under storage conditions; and
    (d) recombining said treated UF retentate with said UF permeate containing flavor and aroma components.

2. The method of claim 1 wherein said ultrafiltration stage contains a UF membrane with pores sufficiently small to retain deterioration causing enzymes in said UF retentate.

3. The method of claim 1 wherein said UF retentate is treated by heating to a sufficient temperature for a sufficient period of time to inactivate a sufficient number of spoilage microorganisms to inhibit spoilage of the juice under storage conditions.

4. The method of claim 2 wherein said UF retentate is treated by heating to a sufficient temperature for a sufficient period of time to inactivate a sufficient amount of said enzymes to inhibit deterioration of the juice under storage conditions.

5. The method of claim 1 further comprising:

reducing the acid content of at least a portion of said UF permeate in an ion exchange deacidification stage; and
    recombining said reduced-acid UF permeate portion with said treated UF retentate and the reminder of said UF permeate.

6. The method of claim 5 wherein said portion of said UF permeate is contacted with an anion exchange resin in said deacidification stage.

7. The method of claim 5 further comprising:

passing said reduced-acid UF permeate portion through a bacteriological filter before recombining with said treated UF retentate and remainder of said UF permeate.

8. The method of claim 1 further comprising:

storing the UF permeate in a storage stage for use in subsequent processing.

9. The method of claim 1 further comprising:

recycling at least a portion of said UF permeate through said ultrafiltration stage.

10. A method of preparing a food juice suitable for storage comprising:
 (a) providing from a juice-bearing fruit or vegetable a juice suitable for ultrafiltration;
 (b) permeating said juice through an ultrafiltration stage which preferentially passes a UF permeate containing flavor and aroma compounds while retaining spoilage microorganisms in a UF retentate;
 (c) concentrating said UF permeate containing flavor and aroma components in a reverse osmosis (RO) stage to preferentially retain said flavor and aroma components in a RO retentate while passing a RO permeate;
 (d) treating said UF retentate to inactivate a sufficient number of spoilage microorganisms to inhibit spoilage of the juice under storage conditions; and
 (e) recombining said treated UF retentate with said RO retentate containing said concentrated flavor and aroma components.

11. The method of claim 10 wherein said ultrafiltration stage contains a UF membrane with pores sufficiently small to retain deterioration causing enzymes in said UF retentate.

12. The method of claim 10 wherein said UF retentate is treated by heating to a sufficient temperature for a sufficient period of time to inactivate a sufficient number of spoilage microorganisms to inhibit spoilage of the juice under storage conditions.

13. The method of claim 11 wherein said UF retentate is treated by heating to a sufficient temperature for a sufficient period of time to inactivate a sufficient amount of said enzymes to inhibit deterioration of the juice under storage conditions.

14. The method of claim 10 further comprising:
 reducing the acid content of at least a portion of said RO retentate in an ion exchange deacidification state; and
 recombining said reduced-acid RO retentate portion with said treated UF retentate and the remainder of said RO retentate.

15. The method of claim 14 wherein said portion of RO retentate is contacted with an anion exchange resin in said deacidification stage.

16. The method of claim 14 further comprising:
 passing said reduced-acid RO retentate portion through a bacteriological filter before recombining with said treated UF retentate and the remainder of said RO retentate.

17. The method of claim 10 further comprising:
 recycling at least a portion of said RO permeate through said ultrafiltration stage.

18. The method of claim 10 further comprising:
 retaining at least a portion of said concentrated UF permeate containing flavor and aroma components.

19. The method of claim 10 further comprising:
 recombining at least a portion of said RO permeate with said treated UF retentate and said RO retentate.

20. The method of claim 10 wherein said UF retentate is treated by heating to a sufficient temperature for a sufficient period of time to inactivate a sufficient number of spoilage microorganisms to inhibit spoilage of the juice under storage conditions and also to concentrate said UF retentate by evaporation concentration.

21. A method of preparing a food juice suitable for storage comprising:
 (a) providing from a juice-bearing fruit or vegetable a juice suitable for ultrafiltration;
 (b) permeating said juice through an ultrafiltration stage which preferentially passes a UF permeate containing flavor and aroma components while retaining spoilage microorganisms and deterioration causing enzymes in a UF retentate;
 (c) heating said UF retentate to a sufficient temperature for a sufficient period of time to inactivate a sufficient number of spoilage microorganisms and deterioration causing enzymes to inhibit spoilage and deterioration under storage conditions; and
 (d) recombining said heated UF retentate with said UF permeate containing flavor and aroma components.

22. The method of claim 21 wherein said ultrafiltration stage contains a UF membrane with pores sufficiently small to retain pectinesterase in said UF retentate.

23. The method of claim 21 further comprising:
 reducing the acid content of at least a portion of said UF permeate by contacting said UF permeate with an anion exchange resin in a deacidification stage; and
 recombining said reduced-acid UF permeate portion with said heated UF retentate and the remainder of said UF permeate.

24. The method of claim 23 further comprising:
 passing said reduced-acid UF permeate portion through a bacteriological filter before recombining with said heated UF retentate and the remainder of said UF permeate.

25. The method of claim 21 further comprising:
 storing said UF permeate in a storage stage for use in subsequent processing.

26. The method of claim 21 further comprising:
 recycling at least a portion of said UF permeate through said ultrafiltration stage.

27. A method of preparing a food juice suitable for storage comprising:
 (a) providing from a juice-bearing fruit or vegetable a juice suitable for ultrafiltration;
 (b) permeating said juice through an ultrafiltration stage which preferentially passes a UF permeate containing flavor and aroma compounds while retaining spoilage microorganisms and deterioration causing enzymes in a UF retentate;
 (c) concentrating said UF permeate containing flavor and aroma components in a reverse osmosis stage to preferentially retain said flavor and aroma components in a RO retentate while passing a RO permeate;
 (d) heating said UF retentate to a sufficient temperature for a sufficient period of time to inactivate a sufficient number of spoilage microorganisms and deterioration causing enzymes to inhibit spoilage deterioration under storage conditions; and
 (e) recombining said heated UF retentate with said concentrated RO retentate containing flavor and aroma components.

28. The method of claim 27 wherein said ultrafiltration stage contains a UF membrane with pores sufficiently small to retain pectinesterase in said UF retentate.

29. The method of claim 27 wherein said UF retentate is treated by heating to a sufficient temperature for a sufficient period of time to concentrate said UF retentate by evaporation concentration.

30. The method of claim 27 further comprising:
reducing the acid content of at least a portion of said RO retentate by contacting said RO retentate with an anion exchange resin in a deacidification stage; and
recombining said reduced-acid RO retentate portion with said heated UF retentate and the remainder of said RO retentate.

31. The method of claim 30 further comprising:
passing said deacidified UF permeate portion through a bacteriological filter before recombining with said heated UF retentate and the remainder of said RO retentate.

32. The method of claim 27 further comprising:
recycling at least a portion of said RO permeate through said ultrafiltration stage.

33. The method of claim 27 further comprising:
retaining at least a portion of said concentrated UF permeate containing flavor and aroma components.

34. The method of claim 27 further comprising:
recombining at least a portion of said RO permeate with said heated UF retentate and said RO retentate.

35. A method of preparing a food juice suitable for storage comprising:
(a) providing from a juice-bearing fruit or vegetable a juice suitable for ultrafiltration;
(b) permeating said juice through an ultrafiltration stage which preferentially passes a UF permeate containing flavor and aroma components while retaining spoilage microorganisms and deterioration causing enzymes in a UF retentate;
(c) heating said UF retentate to a sufficient temperature for a sufficient period of time to inactivate a sufficient number of spoilage microorganisms and deterioration causing enzymes to inhibit spoilage and deterioration under storage conditions; and
(d) reducing the acid content of at least a portion of said UF permeate by contacting said UF permeate with an anion exchange resin in a deacidification stage;
(e) storing said UF permeate in a storage stage until desired for subsequent processing; and
(f) recombining said reduced-acid UF permeate portion with said heated UF retentate and the remainder of said UF permeate.

36. The method of claim 35 wherein said ultrafiltration stage contains a UF membrane with pores sufficiently small to retain pectinesterase in said UF retentate.

37. The method of claim 35 further comprising:
recycling up to ⅔ of said UF permeate through said ultrafiltration stage.

38. The method of claim 35 further comprising:
passing said deacidified UF permeate portion through a bacteriological filter before recombining with said heated UF retentate and the remainder of said UF permeate.

39. A method of preparing a food juice suitable for storage comprising:
(a) providing from a juice-bearing fruit or vegetable a juice suitable for ultrafiltration;
(b) permeating said juice through an ultrafiltration stage which preferentially passes a UF permeate containing flavor and aroma compounds while retaining spoilage microorganisms and deterioration causing enzymes in a UF retentate;
(c) concentrating said UF permeate containing flavor and aroma components in a reverse osmosis stage to preferentially retain said flavor and aroma components in a RO retentate while passing a RO permeate;
(d) heating said UF retentate to a sufficient temperature for a sufficient period of time to inactivate a sufficient number of spoilage microorganisms and deterioration causing enzymes to inhibit spoilage and deterioration under storage conditions;
(e) reducing the acid content of at least a portion of said RO retentate by contacting said RO retentate with an anion exchange resin in a deacidification stage;
(f) recycling at least a portion of said RO permeate through said ultrafiltration stage; and
(g) recombining at least a portion of said RO permeate with said heated UF retentate, said RO retentate, and said reduced-acid RO retentate.

40. The method of claim 39 wherein said ultrafiltration stage contains a UF membrane with pores sufficiently small to retain pectinesterase in said UF retentate.

41. The method of claim 39 wherein said UF retentate is heated to a sufficient temperature for a sufficient period of time inactivate a sufficient number of spoilage microorganisms and deterioration causing enzymes to prevent spoilage and deterioration under storage conditions and also to concentrate said UF retentate by evaporation concentration.

42. The method of claim 39 further comprising:
passing said deacidified RO retentate portion through a bacteriological filter before recombining with said treated UF retentate and the remainder of said RO retentate.

43. The method of claim 39 further comprising:
retaining at least a portion of said RO retentate containing concentrated flavor and aroma components.

* * * * *

UNITED STATES PATENT AND TRADEMARK OFFICE
CERTIFICATE OF CORRECTION

PATENT NO. : 4,643,902
DATED : February 17, 1987
INVENTOR(S) : James T. Lawhon and Edmund W. Lusas It is certified that error appears in the above-identified patent and that said Letters Patent are hereby corrected as shown below:

Column 5, line 65, "The" should read --the--.

In claim 5, line 55, "reminder" should read --remainder--.

In claim 27, line 59, --and-- should be inserted between "spoilage" and "deterioration."

In claim 42, line 50, "treated" should read --heated--.

Signed and Sealed this

First Day of March, 1988

Attest:

DONALD J. QUIGG

*Attesting Officer*  *Commissioner of Patents and Trademarks*